United States Patent [19]
Hodson

[11] 3,742,050
[45] June 26, 1973

[54] CHEMICAL COMPOUNDS, PROCESSES FOR THEIR PREPARATION, AND PHARMACEUTICAL COMPOSITIONS INCORPORATING THE SAME

[75] Inventor: Harold Francis Hodson, London, England

[73] Assignee: Burroughs Wellcome & Co. (U.S.A.) Inc., Tuchahoe, N.Y.

[22] Filed: Feb. 16, 1970

[21] Appl. No.: 11,722

[30] Foreign Application Priority Data
Feb. 28, 1969  Great Britain.................. 10,812/69

[52] U.S. Cl... 260/564 R, 260/329 S, 260/329 AM, 260/332.3 R, 260/332.5, 260/501.14, 424/326, 424/316, 424/275
[51] Int. Cl........................................... C07c 123/00
[58] Field of Search.................... 260/564 R, 501.14

[56] References Cited
UNITED STATES PATENTS
2,252,722  8/1941  Miescher et al. ........... 260/564 R X
2,676,968  4/1954  Burtner........................ 260/564 R X

*Primary Examiner*—Leon Zitver
*Assistant Examiner*—Gerald A. Schwartz
*Attorney*—Sewall P. Bronstein and Donald Brown

[57] ABSTRACT

An amidine of general formula I, as shown in the accompanying drawings, or an acid addition salt thereof wherein: $R^1$ and $R^2$ are the same of different and each is a phenyl or thien-2-yl group, optionally substituted in one or more positions by a substituent selected from the class consisting of halogen, lower alkyl, lower alkoxy, hydroxy, lower alkylthio, trifluoromethyl, phenyl, phenoxy, phenyl-(lower alkyl) and phenyl-(lower alkoxy), each of said phenyl, phenoxy, phenyl-(lower alkyl) and phenyl-(lower alkoxy) substituent groups being optionally substituted in one or more positions by a member selected from the class consisting of halogen, lower alkyl, lower alkoxy, hydroxy and lower alkylthio; $A^1$ is a divalent straight or branched alkylene group containing from two to six carbon atoms and one or two divalent atoms which are each an oxygen or sulphur atom, provided that there are at least two carbon atoms between the divalent atom and the —NH— group and between the two divalent atoms; $A^2$ is a straight or branched alkylene chain containing from one to four carbon atoms; and Z is a member selected from the class consisting of hydrogen and lower alkyl.

The compounds are specific antagonists of serotonin, useful specifically as antipressor agents, anticontracting agents and anti-inflammatory agents. Their high activity is maintained for at least 24 hours.

19 Claims, 25 Drawing Figures

FIG. I 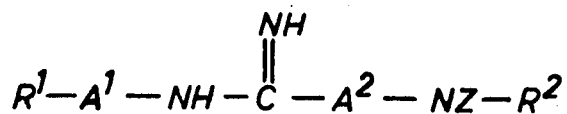
FIG. II 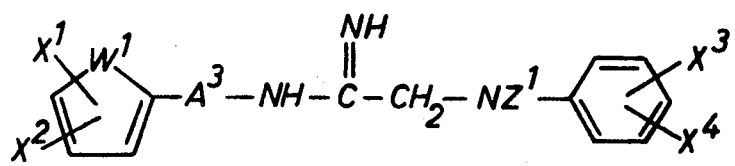
FIG. IIa 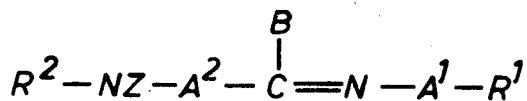
FIG. IIb 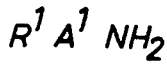
FIG. IIc 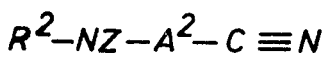
FIG. IId 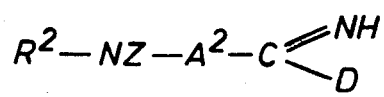
FIG. IIe 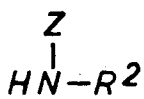
FIG. IIf 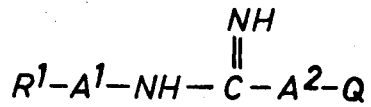
FIG. III 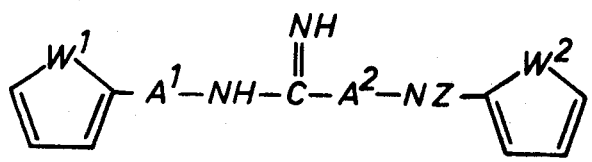

FIG. IV 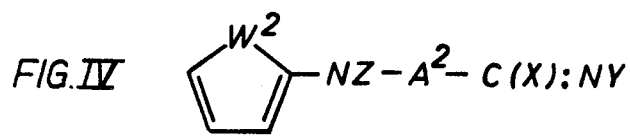
FIG. V   $Y^1 \cdot NH_2$
FIG. VI 
FIG. VII 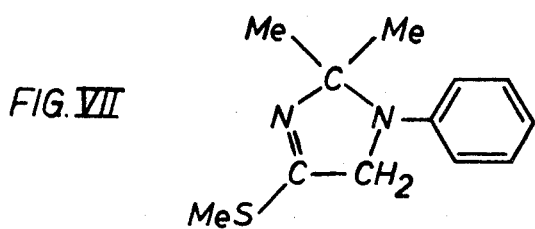
FIG. VIII 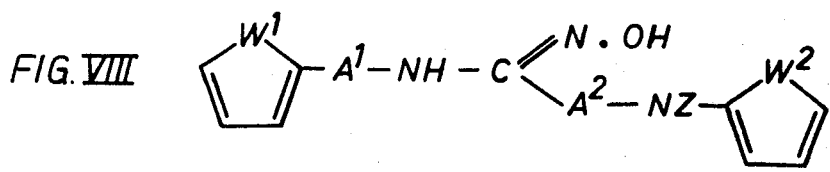
FIG. IX 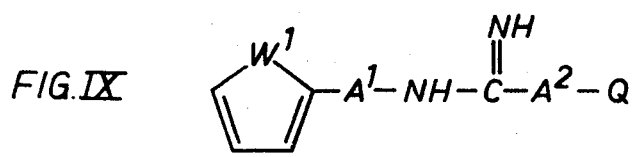
FIG. X 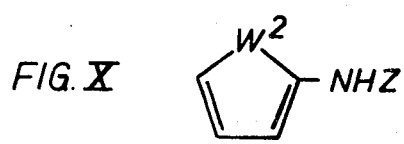

FIG. A
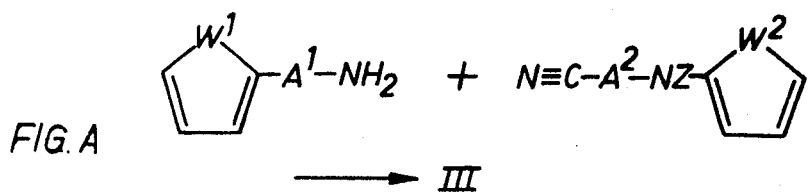
FIG. B
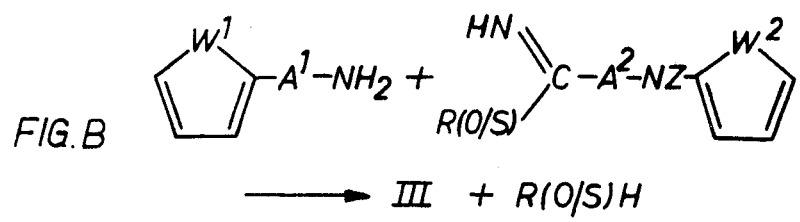
FIG. C
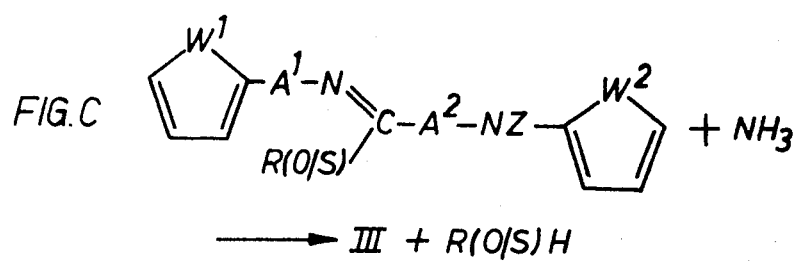
FIG. D
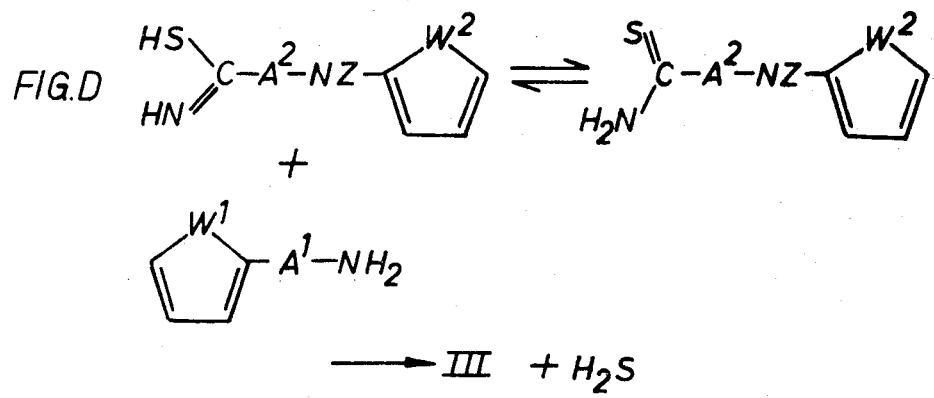

FIG. E 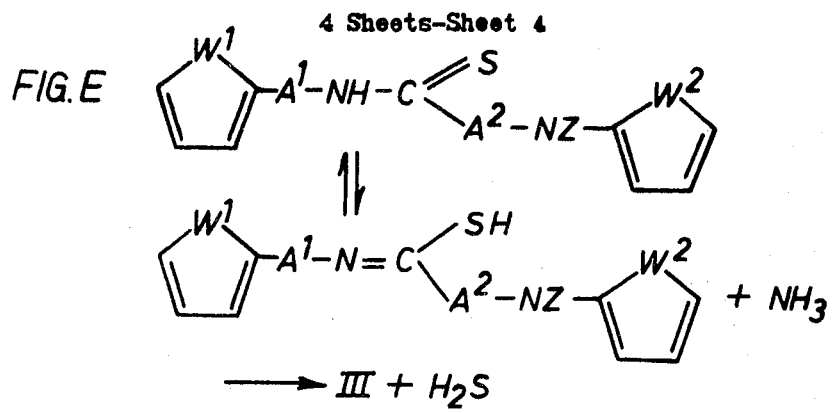
FIG. F 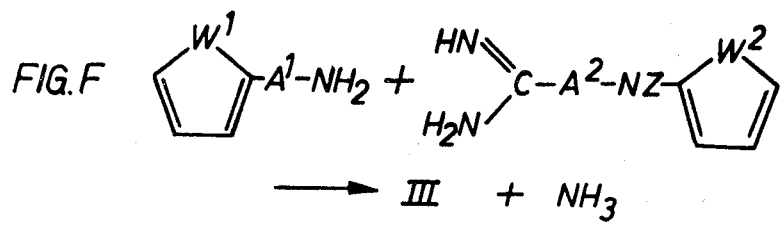
FIG. G 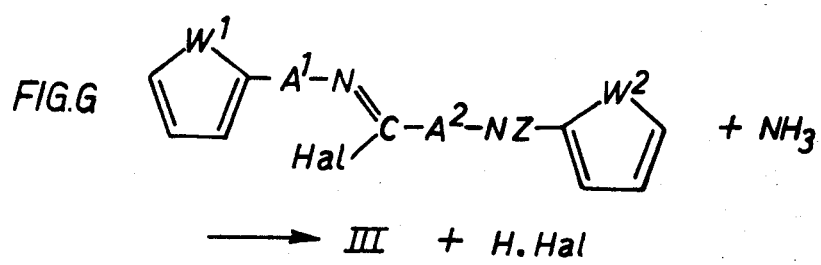
FIG. H 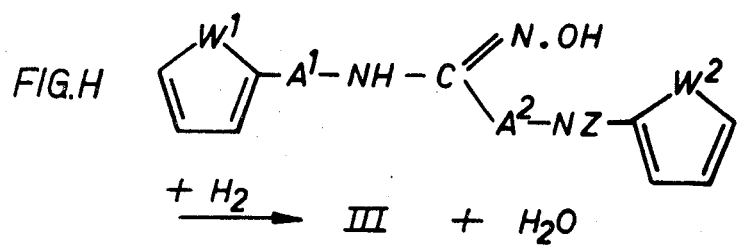
FIG. J 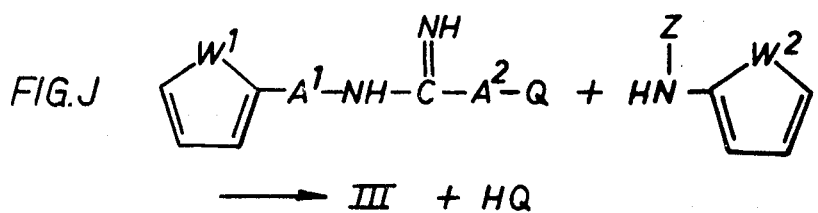

CHEMICAL COMPOUNDS, PROCESSES FOR THEIR PREPARATION, AND PHARMACEUTICAL COMPOSITIONS INCORPORATING THE SAME

This invention concerns new chemical compounds, processes for their preparation and compositions incorporating the same.

Serotonin, otherwise and more systematically known as 5-hydroxytryptamine, is a substance fairly widely distributed throughout the mammalian body, the largest amounts being found in the intestines, brain and blood platelets. Its physiological and pathological significance is not yet fully understood, but is being gradually elucidated. It can induce platelet aggregation. It appears to be of importance in conditions such as toxaemia of pregnancy and habitual abortion. Moreover, it may be associated with inflammatory and/or allergic conditions such as asthma and hay fever, dermatitis and rheumatoid arthritis.

Antagonists of serotonin such as methysergide and ergotamine have been used for treating some of these various states. Sometimes they are used in combination with anti-histamine agents. In particular, favourable results have been reported for the alleviation of allergic conditions, and in the therapy of inflammatory conditions such as dermatitis and rheumatoid arthritis.

Furthermore, anti-serotonin compounds possess value as biologically-active reagents for use in the in vitro and in vivo study of the pharmacological effects of serotonin, and the physiological and pathological mechanisms which are believed to involve the mediation of serotonin.

It is therefore well recognised that there is a need for anti-serotonin compounds.

It is an object of the present invention to provide novel chemical compounds having such a value.

Moreover, it is an object to provide novel chemical compounds which have a particularly valuable specific antagonist effect on serotonin.

Furthermore, it is an object to provide novel chemical compounds which may be used specifically for antagonising the physiological effects of serotonin.

In particularly preferred features, it is an object of the present invention to provide novel chemical compounds which, by virtue of their specific antagonism of serotonin, may be used for controlling thrombus formation and treating inflammatory states, allergic conditions and the toxaemia of pregnancy and habitual abortion.

A further particular object of the present invention is to provide compounds of value in the in vitro and in vivo study of the pharmacological effects of serotonin, and the physiological and pathological mechanisms believed to involve serotonin mediation.

These various objects are, however, in no way limiting on the scope of the present invention, and indeed further objects will appear from the following descriptions.

The present invention is based upon the discovery that the new series of compounds identified hereinafter as the compounds of this invention are particularly effective and specific antagonists of serotonin. The compounds are useful specifically as antipressor agents, anticontracting agents, and anti-inflammatory agents. For instance, it has been found that in pithed rats they antagonise the pressor effect of intravenous serotonin; on isolated rat uterus they antagonise the contracting effect of serotonin; and in rat feet they most effectively antagonise the inflammatory effect of serotonin injected into the plantar surface. Moreover, in rats and mice it has been found that the compounds alleviate the embryo-toxic effects caused by administration of serotonin.

It is furthermore of especial importance that the specific activity of the compounds has been found to be quite remarkably prolonged; in rat feet a high activity is maintained for at least twenty four hours. This opens the way particularly to the therapeutic use of the compounds of the invention in acceptable regimes of administration for the treatment of the previously indicated conditions.

According to this invention in its broadest aspect, there are provided, as new compounds, the amidines which conform to general formula (I) in the accompanying formulae drawings, (where $R^1$ and $R^2$, which may be the same or different, are each a phenyl or thien-2-yl group, optionally substituted in one or more positions by a halogen atom and/or a lower alkyl and/or a lower alkoxy and/or a hydroxy and/or a lower alkylthio and/or a trifluoromethyl and/or a phenyl and/or a phenoxy and/or a phenyl-(lower alkyl) and/or a phenyl-(lower alkoxy) group, each of said phenyl, phenoxy, phenyl-(lower alkyl) and phenyl-(lower alkoxy) groups being optionally substituted in one or more positions by a halogen atom and/or a lower alkyl and/or a lower alkoxy and/or a hydroxy and/or a lower alkylthio group; $A^1$ is a divalent straight or branched (oxy/thio)-alkylene linkage containing from two to six carbon atoms and one or two divalent oxygen and/or sulphur atom(s), provided that there are at least two carbon atoms between the divalent atom and the —NH— group and between the two divalent atoms; $A^2$ is a straight or branched alkylene chain containing from one to four carbon atoms; and Z is a hydrogen atom or a lower alkyl group), and their acid addition salts.

It may here be noted that, unless otherwise expressly stated, the term "lower" is used herein with reference to an alkyl group or to any other grouping which incorporates an alkyl group (such as alkoxy and alkylthio groupings) to signify that such a group or grouping contains from one to four carbon atoms. Such lower alkyl groups may naturally be either straight or branched, and consequently may be enumerated as methyl, ethyl, n-propyl, iso-propyl, n-butyl, iso-butyl and tert.-butyl groups. The substituent Z when an alkyl group preferably will contain not more than three carbon atoms.

Our researches indicate that the essential antiserotonin activity is still displayed when the terminal phenyl and/or thien-2-yl rings bear even several of the diverse substituents suggested above with reference to general formula I. It does however also appear that the best of the compounds of this invention, in terms of preparative convenience and especially of the level and duration of their anti-serotonin activity, are those in which:

the terminal phenyl and/or thien-2-yl rings bear either one or two substituents being halogen atom(s) and/or lower alkyl and/or alkoxy group(s) and/or the trifluoromethyl group;

the linkage $A^1$ is an (oxy/thio)-alkylene chain with no more than four carbon atoms and a single oxygen or sulphur atom;

the linkage $A^2$ is a methylene group; and the substituent Z is either a hydrogen atom or a methyl group.

The most preferred compounds of this invention (within general formula I) are those anilinoacetamidines which conform to general formula (II) in the accompanying formulae drawings, (where $W^1$ represents a —CH=CH— or an —S— linkage; $A^3$ is an (oxy/thio)-alkylene linkage containing two to four carbon atoms and a single oxygen or sulphur atom separated by at least two carbon atoms from the —NH— group; $X^1$, $X^2$, $X^3$ and $X^4$ when not hydrogen may each individually be a halogen atom or a lower alkyl, lower alkoxy or trifluoromethyl group; and $Z^1$ is a hydrogen atom or a methyl group) and their acid addition salts formed with non-toxic acid anions.

When the phenyl or thien-2-yl rings bear halogen substituents these can be fluoro-, iodo- or bromo-groups but should above all be chloro-groups. When the substituents are lower alkyl they are preferably methyl or less desirably ethyl groups; and when lower alkoxy, they are preferably methoxy groups.

The antiserotonin activity of the amidines of this invention resides in the free base, and thus the nature of the acid participating in the acid addition salts is of minor importance. In the preparation of the compounds of this invention, as will be described subsequently, acid addition salts of any kind may be formed. However, leaving aside such last-stage intermediates formed in the preparative processes, it will be understood that for use in therapy the compounds of the invention can be employed only in the form of acid addition salts derived from non-toxic acids. Of course, the acids employed will normally be those currently recognized to be most desirable from both pharmacological and pharmaceutical standpoints, which we shall herein designate as "pharmaceutically acceptable" acids. Instances of suitable acid addition salts formed with pharmaceutically-acceptable acid anions include those formed with hydrochloric acid, hydriodic acid, sulphuric acid, para-toluene-sulphonic acid, maleic acid, lactic acid, citric acid, tartaric acid, succinic acid, oxalic acid, para-chloro-benzene-sulphonic acid and many others.

Specific preferred antiserotonin acetamidines in accordance with this invention include the following:

*     N-[2-(3-Methoxy-phenoxy)-propyl]-3-methyl-anilino-acetamidine and its non-toxic salts, especially the hydriodide;
  N-[2-(Benzyloxy)-propyl]-anilino-acetamidine and its non-toxic salts, especially the hydriodide;
  N-[2-(3-Methoxy-phenoxy)-propyl]-3,4-dimethyl-anilino-acetamidine and its non-toxic salts, especially the hydriodide;
  N-[2-(3-Methyl-phenoxy)-propyl]-4-chloro-anilino-acetamidine and its non-toxic salts, especially the hydriodide;
  N-[2-(5-Chloro-thien-2-yl-methoxy)-propyl]-3,4-dimethyl-anilino-acetamidine and its non-toxic salts, especially the hydriodide;
* N-[2-(3-Methyl-phenoxy)-propyl]-3-methyl-anilino-acetamidine and its non-toxic salts, especially the hydriodide;
  N-[2-(3-Methoxy-phenoxy)-propyl]-3-trifluoromethyl-anilino-acetamidine and its non-toxic salts, especially the hydriodide;
*     N-[2-(3-Chloro-phenoxy)-propyl]-anilino-acetamidine and its non-toxic salts, especially the hydriodide and hydrochloride;
* N-[2-(3-Ethyl-phenoxy)-propyl]-anilino-acetamidine and its non-toxic salts, especially the hydriodide;
  N-[2-(Thien-2-yl-methoxy)-propyl]-3-methyl-anilino-acetamidine and its non-toxic salts, especially the hydriodide;
  N-[2-(Phenoxy)-propyl]-$N^1$-(methyl)-anilino-acetamidine and its non-toxic salts, especially the para-toluene-sulphonate;
  N-[2-(Phenoxy)-ethyl]-anilino-acetamidine and its non-toxic salts, especially the para-toluene-sulphonate;
* N-[2-(Phenoxy)-propyl]-anilino-acetamidine and its non-toxic salts, especially the para-toluene-sulphonate;
  N-[2-(3-Methoxy-phenoxy)-propyl]-3-chloro-anilino-acetamidine and its non-toxic salts, especially the hydriodide; and
  N-[2-(3-Benzyl-phenoxy)-propyl]-anilino-acetamidine and its non-toxic salts, especially the hydriodide.

The compounds currently regarded as outstanding are those identified above by an asterisk (*).

We have also found that the antiserotonin amidines of this invention may be prepared, usually fairly readily and in reasonable yield, by any convenient or known method for preparing N-monosubstituted amidines.

Thus they may be prepared by the procedure of reacting the appropriate imidocarbonyl compound with ammonia or a primary amine (when the imidocarbonyl compound is a nitrile, an imidoester of imido-thioester, or an imidoamide [amidine] or thioamide) or by reacting it with a reducing agent (when the imidocarbonyl compound is an amidoxime) or by reacting it with an amino-substituted phenyl/thien-2-yl ring (when the imidocarbonyl compound is an amidine appropriately substituted with a nucleophilic group) so as to form the corresponding amidine of formula I or II, and thereafter if desired and where necessary converting the resultant product into an acid addition salt or another acid addition salt thereof, by any of the conventional methods available for that purpose. Accordingly the amidines of general formula I may be prepared by methods including a process characterised in that (a) ammonia is reacted with an imidocarbonyl compound of general formula II (a) wherein $R^1$, $R^2$, $A^1$, $A^2$ and Z have their previously stated meanings, and B represents an alkoxy, alkylthio, or mercapto group or a halogen atom; or (b) a primary amine of general formula II (b), wherein $R^1$ and $A^1$ have their previously stated meanings, is reacted either with a nitrile of general formula II (c), wherein $A^2$, $R^2$ and Z have their previously stated meanings, at a temperature of at least 80°C, usually above 200°C, and sufficient to yield the sought amidine in the desired time, or with an intermediate addition product formed notionally or actually by conversion of the nitrile and having general formula II (d), in which $A^2$ $R^2$ and Z have their previously stated meanings, and D indicates an amino-, mercapto-, alkylthio- or alkoxy group; or (c) a primary amine of general formula II (e), wherein $R^2$ and Z have their previously stated meanings, is reacted with an amidine of general formula II (f), wherein $R^1$, $A^1$ and $A^2$ have their previously stated meanings and Q is a nucleophilic group.

These preparative procedures are best carried out in the liquid phase, thus either in a solvent or in molten condition, and proceed most satisfactorily at temperatures above ambient up to about 300°C, usually best between 30°C and the reflux temperature of the solvent if one is employed.

The preparative procedures of this invention, in one of their aspects, include processes for preparing amidines which possess basic structural formula (III) in the accompanying formulae drawings, (where $W^1$ and $W^2$, which may be identical, each represents either a —CH=CH— or an —S— linkage; $A^1$ is a straight or branched (oxy/thio)-alkylene chain containing one or two divalent oxygen and/or sulphur atoms and from two to six carbon atoms with at least two carbon atoms directly separating any divalent atom from its neighbour and from the —NH— group; $A^2$ is a straight or branched alkylene chain containing from one to four carbon atoms; and Z is a hydrogen atom or a lower alkyl group) and their acid addition salts, in which an imido-carbonyl compound which possesses basic structural formula (IV), (where $W^2$, Z and $A^2$ have their previously stated meanings; and X is a halogen atom, an amino $(-NH)_2$ group, a mercapto (—SH) group, an alkoxy (—OR) group or an alkylthio (—SR) group, wherein the alkyl group R preferably contains from one to six carbon atoms) is reacted with an amino compound conforming to general formula (V), (where one of the substituents Y and $Y^1$ is a hydrogen atom and the other is the grouping which possesses basic structural formula (VI), (where $W^1$ and $A^1$ have their previously indicated meanings), or where X and Y together form a direct carbon-nitrogen bond and $Y^1$ is the grouping of general formula (VI), to yield the desired amidine reaction product which may be isolated from the reaction mixture and/or, if desired, converted into free base or acid addition salt as appropriate.

The processes are effected conveniently at temperatures from ambient upwards, and in the liquid phase normally in solution in a polar solvent; it is often best that one of the reactants should be used in the form of an acid addition salt.

In the formulae III, IV and VI it should be noted that for convenience the substituents (if any) upon the terminal phenyl and/or thien-2-yl rings are not shown; and that the same convention is utilized in the Reaction Diagrams also set out in the accompanying formulae drawings, and referred to in the discussion below.

Within the broad definition set out above it is possible to sub-divide the processes of this invention according to the particular nature of the imido-carbonyl compound employed as the starting material.

Thus, according to one particular preferred process the imido-carbonyl compound employed is a nitrile (or formula IV where X and Y together form a direct carbon-nitrogen bond) and this is reacted with a primary amine (of formulae V and VI) in accordance with Diagram (A), where $W^1$, $W^2$, $A^1$, $A^2$ and Z all have their previously stated meanings.

This reaction of Diagram A may be performed with the free primary amine in the presence of a strongly basic catalyst such as sodium or sodamide, or in the presence of a Lewis acid such as aluminium chloride; but it is preferably effected using an acid addition salt thereof. The preferred salts are in fact the arylsulphonic acid addition salts of the primary amine, conveniently for instance salts thereof with either para-toluene sulphonic acid or para-chlorobenzene sulphonic acid.

The reaction of Diagram A is best performed in the liquid phase and therefore conveniently at a temperature greater than 80°C, preferably up to but not exceeding 300°C.

According to another particular preferred process, the imido-carbonyl compound employed is an imido-ester or imido-thioester (of formula IV where X is an alkoxy (—OR) group or an alkylthio (—SR) group and Y is a hydrogen atom) and this equally is reacted with a primary amine (of formulae V and VI) in accordance with Diagram (B), where $W^1$, $W^2$, $A^1$, $A^2$ and Z all have their previously stated meanings; and —(O/S)R represents an alkoxy or alkylthio group wherein the alkyl group R preferably contains not more than six carbon atoms.

In the reaction of Diagram B the starting material may be a condensate formed between the imidocarbonyl compound and a ketone. In the case of the imido-thioester, for example, it is convenient to prepare this in a preliminary stage by reaction between the corresponding thioamide and an alkylating agent, this reaction being best performed in solution in a ketone such as acetone or cyclo-hexanone. It has, however, been found that in some cases a labile condensate (itself an imidocarbonyl compound) is formed between the ketonic solvent and the expected imidothioester, which in the case of the reaction between methyliodide and anilinothioacetamide in the presence of acetone is thought to take the form of formula (VII). It has been established that in such a case it is quite unnecessary to recover the imidocarbonyl compound in Reaction Diagram B from the condensate before performing the reaction with the primary amine, but instead the condensate can be brought directly to reaction in that form. During the reaction the acetone is lost, and the desired final compound of formula III is obtained.

In a closely-related variant of the reaction of Diagram B the imidocarbonyl compound employed is again an imido-ester or imido-thioester (of formula IV where X is an alkoxy (—OR) group or an alkylthio (—SR) group and Y is the grouping of formula VI and this is reacted instead with ammonia (of formula V where $Y^1$ is H) in accordance with Diagram (C), where $W^1$, $W^2$, $A^1$, $A^2$ and Z all have their previously stated meanings, and —(O/S)R represents an alkoxy or alkylthio group, preferably one wherein the alkyl group R contains not more than six carbon atoms.

In both the reactions of Diagrams B and C the imido-ester starting material may most conveniently be one wherein the alkoxy group (—OR) is the ethoxy group, while the imido-thioester starting material may most conveniently be one wherein the alkylthio group (—SR) is the methylthio group. The reaction usually proceeds best when the imidoester or imido-thioester is present in the form of an acid addition salt thereof. The acid addition salt may advantageously be one formed with a hydrogen halide, for instance the hydrochloride, hydrobromide or hydriodide.

The reaction may most conveniently be effected in solution in a polar organic solvent, for instance an alkanol such as ethanol, and at an elevated temperature of about 30°C up to the reflux temperature of the solvent.

According to yet another particular preferred process, the imido-carbonyl compound employed is a thioamide (of formula IV where in the tautomeric form X is the mercapto (—SH) group and Y is a hydrogen atom) and this also is reacted with a primary amine (of formulae V and VI) in accordance with Diagram (D), where $W^1$, $W^2$, $A^1$, $A^2$ and Z all have their previously stated meanings.

Alternatively in a closely-related variant of the reaction of Diagram D the imidocarbonyl compound employed is again a thioamide (of formula IV where in the tautomeric form X is the mercapto (—SH) group and Y is the grouping of formula VI) and this is reacted instead with ammonia (of formula V where $Y^1$ is hydrogen) in accordance with Diagram (E), where $W^1$, $W^2$, $A^1$, $A^2$ and Z all have their previously stated meanings.

In both these reactions of Diagrams D and E the reaction may most conveniently be effected in solution in a polar organic solvent, advantageously an alkanol such as ethanol. The reaction is best carried out at elevated temperatures, such as from about 30°C up to the reflux temperature of the solvent. The presence of a heavy metal salt, such as a salt of mercury or zinc, preferably a mercuric halide or zinc halide, may be advantageous.

According to a further particular preferred process the imidocarbonyl compound employed is itself already an amidine (of formula IV where X is the amino (—NH$_2$) group and Y is a hydrogen atom) and this is reacted with a primary amine (of the formulae V and VI) in accordance with Diagram (F), where $W^1$, $W^2$, $A^1$, $A^2$ and Z all have their previously stated meanings.

This reaction of Diagram F is preferably effected utilizing the primary amine (i.e. the compound of formulae V and VI) in the form of an acid addition salt. The reaction may most conveniently be performed in solution in an inert organic solvent, for instance benzene formulae an alkanol such as ethanol. The reaction is best carried out at an elevated temperature between 30°C and the reflux temperature of the solvent.

According to a still further particular preferred process the imido-carbonyl compound employed is an imidoyl halide (of formula IV where X is a halogen atom and Y is the grouping of formula VI) and this is reacted with ammonia (of formula V where $Y^1$ is hydrogen) in accordance with Diagram (G), where $W^1$, $W^2$, $A^1$, $A^2$ and Z all have their previously stated meanings, and Hal represents a halogen atom. The halide is preferably the chloride, and the reaction is conveniently effected at an elevated temperature, thus usually between 30°C and 200°C.

This reaction of Diagram G is preferably preceded by the preliminary step of forming the imidoyl halide starting material by reacting the corresponding amide with a halogenating agent such as the appropriate phosphorus pentahalide, for example, phosphorus pentachloride.

The preparative procedures of this invention, in another of their aspects, also include processes for preparing amidines which possess basic structural formula (III) and their acid addition salts, in which an imidocarbonyl compound which is an amidoxime possessing basic structural formula (VIII), (where $W^1$, $W^2$, $A^1$, $A^2$ and Z all have their previously indicated meanings) is reacted with a reducing agent to yield the desired amidine reaction product, which may be isolated from the reaction mixture and/or, if desired, converted into free base or acid addition salt as appropriate.

The reaction proceeds as shown in Diagram (H), where $W^1$, $W^2$, $A^1$, $A^2$ and Z all have their previously stated meanings.

The reduction should preferably be effected using gaseous hydrogen as the reducing agent, and in the presence of a hydrogenation catalyst, which desirably should by Raney nickel.

The preparative procedures of this invention, in yet another of their aspects, include processes for preparing amidines which possess basic structural formula (III) and their acid addition salts, in which an imidocarbonyl compound which possesses basic structural formula (IX) (where $W^1$, $A^1$ and $A^2$ all have their previously stated meanings, and Q is a nucleophilic group) is reacted with an amino compound which possesses basic structural formula (X), (where $W^2$ and Z each have their previously stated meanings) to yield the desired amidine reaction product, normally in the form of its acid addition salt, which may be isolated as such from the reaction mixture and/or, if desired, converted into free base or acid addition salt as appropriate.

The reaction proceeds as shown in Diagram (J) where $W^1$, $W^2$, $A^1$, $A^2$, Z and Q all have their previously stated meanings.

This reaction of Diagram J is best performed using an imido-carbonyl compound as starting material wherein the nucleophilic group Q is a so-called "leaving group", especially for instance such as a halogen atom, preferably a chlorine atom, or a sulphonoxy group, preferably a toluene-sulphonoxy or a methyl-sulphonoxy group.

The reaction is most conveniently effected in the liquid phase at an elevated temperature; it may be carried out in solution in a polar organic solvent such as ethanol, and preferably at an elevated temperature in the range of from 30°C up to the reflux temperature of the reaction mixture.

The acid addition salt may be readily converted either into the free base or into other acid addition salts by the conventional procedures. Moreover, the free base, if desired, may be secured directly as the reaction product simply by effecting the reaction in the presence of an acid-binding agent.

The invention of course includes the amidines of general formula III and their acid addition salts whenever produced by the processes hereinbefore described and hereinafter further illustrated. It will moreover be understood that where the product formed by any of the reactions is an acid addition salt unsuited for use as such in therapy, it may be converted directly into a non-toxic salt by double decomposition (metathesis) using any appropriate conventional treatment in solution or on an ion-exchange column, or it may be converted into the free base, again by any appropriate conventional treatment, and if desired the free base may thereafter be salified to yield a pharmaceutically acceptable salt. In this way it is easily possible to secure salts such as hydriodides, hydrochlorides, sulphates, lactates, citrates, tartrates, succinates, oxalates, para-toluene-sulphonates, para-chlorobenzene-sulphonates and maleates.

For administration in pharmacology the amidines of general formulae I, II and III and the non-toxic acid addition salts thereof may be formulated with an acceptable carrier therefor into pharmaceutical compositions. The composition may be made by any convenient method comprising bringing the components into association with each other, for example, by admixture.

For oral administration, fine powders or granules of the compound or salt may contain diluents and dispersing and surface active agents, and may be presented in a draught in water or in a syrup; in capsules or sachets, either in the dry state or in a non-aqueous suspension, when a suspending agent may also be included; in tablets, when binders and lubricants may also be included; or in a suspension in water or in a syrup or an oil or in a water/oil emulsion, when flavouring, preserving, suspending, thickening and emulsifying agents may also be included. The granules or the tablets may be coated, and the tablets may be scored.

For parenteral administration, the compound or salt may be presented in unit dose or multi-dose containers, in aqueous or non-aqueous injectable solutions which may contain anti-oxidants, buffers, bacteriostats and solutes which render the composition as a whole isotonic with the blood; or in aqueous or non-aqueous injectable suspensions, when suspending agents and thickening agents may also be included; extemporaneous injection solutions may be made from sterile powders, granules or tablets which may contain diluents, dispersing and surface active agents, binders and lubricants.

For topical administration, the compound or salt may be presented in ointments by incorporation in a fatty and/or water miscible base. More, it may be presented in creams by dissolving or dispersing in the oily or aqueous phase, when an emulsifying agent may be included.

The compound or salt may also be presented in suppositories or pessaries by incorporation in a suppository base.

It will be understood that the absolute quantity of compound or salt present in any discrete dosage unit should not exceed that appropriate to the rate and manner of administration to be employed, yet on the other hand should also desirably be adequate to allow the desired rate of administration to be achieved by a small number of dosage units, preferably a single one. The average rate of administration will, moreover, depend in particular on the actual compound or salt being presented. Nevertheless, in general, it may be said that the preferred dosage range is from 0.03 to 7 mg/kg, and so for an adult is from 2 to 500 mg., especially 0.07 to 3 mg/kg., of base per day, administered desirably at the most three times a day.

In yet another aspect of this invention there are also provided processes for antagonising the physiological effects of 5-hydroxy-tryptamine which comprise administering one or more amidines of general formulae I, II or III, or acid addition salts thereof.

The following Examples will now be given, though only by way of illustration, to show details of particularly preferred reagents, reactions and techniques used in the processes of this invention.

Example 1: Preparation of N-[2-(3-Methoxyphenoxy)-propyl]-3-chloro-anilino-acetamidine hydriodide.

Stage A: Preparation of the intermediate Ethyl(3-chloroanilino)-acetimidate hydrochloride.

A solution of 7.5g. of 3-chloro-anilino-acetonitrile in 75ml. of dry chloroform containing 2.9ml. of dry ethanol was treated, at 0°C, with hydrogen chloride until saturated; some crystalline material had separated by this time. The mixture was kept at 4°C for 3 days and then filtered, washed with dry chloroform, and dried in vacuo to give a colourless crystalline product containing ethyl (3-chloro-anilino)-acetimidate hydrochloride.

Stage B: Preparation of N-[2-(3-Methoxyphenoxy)-propyl]-3-chloro-anilino-acetamidine hydriodide.

5.0g of the imidoester hydrochloride from Stage A were added to a cooled (0°C) solution of 3.6g of 2-(3-methoxy-phenoxy)-propyl-amine in 10ml. of dry ethanol. The resulting solution was kept at room temperature for 1 hour, then refluxed for 30 minutes and finally evaporated under reduced pressure. The residual oil was triturated three times with ether and then dissolved in 10ml. of 50 percent aqueous ethanol with gentle warming; the solution was treated with an excess of aqueous potassium iodide and left at 4°C overnight. The resulting crystalline precipitate was filtered, dried and recrystallised from a mixture of ethanol and ether to give pure N-[2-(3-methoxyphenoxy)-propyl]-3-chloro-anilino-acetamidine hydriodide, m.p. 153°–154°C.

Example 2: Preparation of N-[2-(Phenoxy)-propyl]-4-chloro-anilino-acetamidine hydriodide Stage A: Preparation of the intermediate S-methyl (4-chloro-anilino)-thioacetimidate hydriodide.

A solution of 4g. of 4-chloro-anilino-thioacetamide in 15 ml. of acetone was treated with 2ml. of methyl iodide, and the mixture was stirred at room temperature for 1½ hours. The resulting solid was filtered off, washed with acetone and with ether, and then dried in vacuo to give the desired intermediate, S-methyl 4-chloroanilino-thioacetimidate hydriodide, m.p. 144°–147°C (with decomposition).

Stage B: Preparation of N-[2-(Phenoxy)-propyl]-4-chloro-anilino-acetamidine hydriodide.

A solution of 4g. of the imidothioester hydriodide from Stage A in 10ml. ethanol was treated with 1.8g. of 2-(phenoxy)-propyl-amine. Air was bubbled through the mixture for 2 hours, followed by refluxing for 30 minutes. The resulting solution was cooled slightly, diluted with ether until just cloudy, and left at room temperature for 1 hour. The resultant crystalline solid was filtered off and dried, to give 3.6g. of an impure product, m.p. 169°–170°C. Recrystallisation from a mixture of isopropanol and ether gave a pure sample of the desired N-[2-(phenoxy)-propyl]-4-chloro-anilino-acetamidine hydriodide, m.p. 170°–171°C.

Examples 3–22: Preparation of various N-(aryloxyalkyl)-anilino-acetamidine hydriodides.

The various N-(aryloxyalkyl)-anilino-acetamidine hydriodides identified in Table 1 below were prepared by methods analogous to those described in Example 2 above. Thus in each case the appropriate anilino-thioacetamide was reacted with methyl iodide in acetone (Stage A), followed by reaction of the resultant imidothioester hydriodide with an aryloxyalkylamine in ethanol (Stage B). In some cases the intermediate imidothioester hydriodides separated as complexes with acetone but these complexes reacted normally in the second stage. The products were recrystallised from the solvents indicated in Table 1 below and in the stated order. It may here be noted that preparative procedures for securing the anilino-acetonitriles and anilino-thioacetamides used as starting material in Stage A of the processes of Examples 1 and 2 and not previously described are set out subsequently under Method A and Method B respectively.

Table 1: N-[2-(Aryloxy)-propyl]-anilino-acetamidine hydriodides, of the general formula:

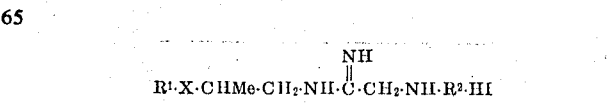

| Example number | R¹ | X | R² | M.P. (°C.) | Crystallisation solvents* |
|---|---|---|---|---|---|
| 3 | 3-methoxy-phenyl | O | 3-methyl-phenyl | 150–151 | 1, 2 |
| 4 | Phenyl | CH₂O | Phenyl | 142–144 | 3 |
| 5 | 3-methoxy-phenyl | O | 3,4-dimethyl-phenyl | 163–164 | 4 |
| 6 | 3-methyl-phenyl | O | 4-chloro-phenyl | 189–190 | 6, 7 |
| 7 | 3,4-dimethyl-phenyl | O | do | 219–220 | 6, 7 |
| 8 | 3-methyl-phenyl | CH₂O | do | 134–135 | 2, 5 |
| 9 | 2-(5-chloro)-thienyl | CH₂O | 3,4-dimethyl-phenyl | 185–186 | 7 |
| 10 | 2-chloro-phenyl | O | do | 178–179 | 7 |
| 11 | 3-methyl-phenyl | O | 3-methyl-phenyl | 178–179 | 7 |
| 12 | 3-methoxy-phenyl | O | 3-trifluoro-methylphenyl | 130–131 | 5 |
| 13 | 3-chloro-phenyl | O | Phenyl | 176–177 | 7, 2 |
| 14 | 3-ethyl-phenyl | O | do | 154–155 | 2, 5 |
| 15 | 2-thienyl | CH₂O | 3-methyl-phenyl | 131–132 | 5 |
| 16 | 3-benzyl-phenyl | O | Phenyl | 148–149 | 10, 5 |
| 17 | 3-fluorophenyl | O | do | 181–182 | 7, 3 |
| 18 | 3-bromophenyl | O | do | 165–166 | 4, 5 |
| 19 | 3-chloro-phenyl | CH₂O | do | 114.9 | 5, 10 |
| 20 | 3-benzyloxyphenyl | CH₂O | do | 125.3 | 2 |
| 21 | 3-t-butylphenyl | O | do | 126–127 | 11 |
| 22 | 3-phenyl-phenyl | O | do | 114–115 | 10 |

(*) The Crystallisation solvents employed in the preparations were as follows:
1. A mixture of acetone and ether.
2. A mixture of ethanol and ether.
3. A mixture of methanol and ether.
4. A mixture of ethyl acetate and ethanol.
5. A mixture of *iso*propanol and ether.
6. Ethanol.
7. *Iso*propanol.
8. A mixture of ethanol and water.
9. A mixture of methanol and water.
10. A mixture of ethyl acetate and ether.
11. Ethyl acetate.
12. A mixture of ethanol, ethyl acetate and ether.

Examples 23–28: Preparation of various N-(aryloxyalkyl)-anilino-acetamidine arylsulphonates.

The various substituted amidine arylsulphonates identified in Table 2 below were prepared by methods analogous to those used in Examples 2–22 above, save that the product was isolated by adding a saturated aqueous solution of a sodium arylsulphonate, instead of ether, to the ethanolic reaction solution. Some of the resultant salts crystallised as hydrates, and these were dried at ambient temperature and pressure.

Table 2: N-(Aryloxyalkyl)-anilino-acetamidine arylsulphonates, of the general formula:

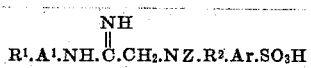

heated to 100°C for 8 hours. The total mixture was then partitioned between an excess of 2N-aqueous sodium hydroxide and ether. The aqueous phase was extracted once more with ether and the combined ether solution was dried over anhydrous potassium carbonate and evaporated under reduced pressure. The residue was dissolved in a little ethanol (about 4ml.) and treated with 60ml. of water and 4ml. of 5N-hydrochloric acid with vigorous stirring. The mixture was allowed to settle and the supernatant solution was decanted from the oil which was shown by thin layer chromatography to contain most of the expected amidine. This oil was triturated three times with ether, the ether discarded, and the residue then dissolved in a little ethanol, treated with an excess of aqueous potassium iodide, and left at 4°C overnight. The resulting sticky solid was removed and crystallised from a mixture of ethanol and ether to give a colourless crystalline product, m.p. 149°–153°C. Recrystallisation from a mixture of ethanol and water and then from a mixture of ethanol and ether gave N-[2-(3-methoxyphenoxy)-propyl]-3-chloro-anilino-acetamidine hydriodide, m.p. 152.5°–154°C, identical with that whose preparation was described in Example 1.

A mixture of 0.9g. of 2-(phenoxy)-propylamine and

Example 30: Preparation of N-[2-(Phenoxy)-propyl]-anilino-acetamidine p-toluene-sulphonate.

1.9g. of anilino-acetamidine p-toluene-sulphonate in 10ml. of ethanol was refluxed for 2½ hours, during

| Example Number | R¹ | A¹ | Z | R² | Arylsulphonate Ar.SO₃H | M.P. (°C.) | Crystallisation Solvent* |
|---|---|---|---|---|---|---|---|
| 23 | Phenyl | O.CHMe.CH₂ | CH₃ | Phenyl | p-Toluenesulphonate | †88–89 | 8, 9 |
| 24 | do | O.CH₂.CH₂ | H | do | do | †84–85 | 4, 8, 9, 4 |
| 25 | do | O.CHMe.CH₂ | H | 2,6-dimethylphenyl | Naphthalene-2-sulphonate | 160–161 | 8, 2, 7 |
| 26 | 3-chlorophenyl | O.CH₂.CH₂ | H | Phenyl | p-Toluenesulphonate | 101–103 | 5, 11 |
| 27 | Phenyl | S.CHMe.CH₂ | H | do | do | 105.8 | 2 |
| 28 | 3-ethoxyphenyl | OCH₂.CH₂ | H | do | do | 133–135 | 12 |

*See footnotes to Table 1. †Monohydrate.

Example 29: Preparation of N-[2-(3-Methoxyphenoxy)-propyl]-3-chloro-anilino-acetamidine hydriodide. 5 A mixture of 3.6g. of 2-(3-methoxyphenoxy)-propyl-amine and 3.35g. of 3-chloro-anilino-acetonitrile in 2.5mls. of acetic acid was which time nitrogen was gently bubbled through the solution. The reaction solution was cooled and diluted with water to precipitate an oil, which crystallised on scratching. The solid was removed and recystallised first from a mixture of methanol and water and then from a mixture of isopropanol and water, to give pure N-[2-(phenoxy)-propyl]-anilino-acetamidine p-toluene-sulphonate, m.p. 91°–95°C.

Example 31: Preparation of N-[2-(3-Methoxyphenoxy)-propyl]-3-chloro-anilino-acetamidine hydriodide.

Stage A: Preparation of 3-Chloro-anilino-acetamidine p-toluene-sulphonate.

Dry hydrogen chloride was passed into a stirred and ice-cooled solution of 10g. of 3-chloro-anilino-acetonitrile in 3.9ml. of dry ethanol and 100ml. of dry chloroform until saturated. After 3 days at 5°C the mixture was filtered, and the solid thus separated was treated with a slight excess of ethanolic ammonia (until the smell of ammonia persisted), and kept for 1 day at room temperature. The reaction mixture was then heated, filtered hot, and the filtrate was evaporated to small volume and treated with an excess of aqueous sodium para-toluene-sulphonate. The resulting cyrstalline precipitate was collected, and recrystallised from a mixture of ethanol and water, to give pure 3-chloro-anilino-acetamidine para-toluene-sulphonate, m.p. 169°–170°C.

Stage B: Preparation of N-[2-(3-Methoxyphenoxy)-propyl]-3-chloro-anilino-acetamidine hydriodide.

The 3-chloro-anilino-acetamidine para-toluene-sulphonate from Stage A was reacted with 2-(3-methoxyphenoxy)-propylamine in the manner described in Example 30. The ethanolic reaction solution was treated with a fourfold excess of aqueous potassium iodide to precipitate the hydriodide salt, which was collected by filtration. Recrystallisation from a mixture of ethanol and water and then from a mixture of acetone and ether gave pure N-[2-(3-methoxyphenoxy)-propyl]-3-chloro-anilino-acetamidine hydriodide, m.p. 153°–154°C, identical with that whose preparation was described in Examples 1 and 29.

Example 32: Preparation of N-[2-(3-Methoxyphenoxy)-propyl]-3-methyl-anilino-acetamidine hydriodide.

Stage A: Preparation of 3-Methyl-anilino-acetamidine-para-toluene-sulphonate.

Using the method of Stage A of Example 31, 3-methyl-anilino-acetamidine para-toluene-sulphonate was prepared, which after recrystallisation from ethanol had m.p. 170°–172°C.

Stage B: Preparation of N-[2-(3-Methoxyphenoxy)-propyl]-3-methyl-anilino-acetamidine hydriodide.

The amidine from Stage A was reacted with 2-(3-methoxy-phenoxy)-propylamine in exactly the same manner as described in Stage B of Example 31. The resultant product,N-[2-(3-methoxyphenoxy)-propyl]-3-methylanilino-acetamidine hydriodide, m.p. 150°–151°C, was identical with that whose preparation was described in Example 3.

Example 33: Preparation of N-[2-(Phenoxy)-propyl]-anilino-acetamidine hydriodide.

Stage A: Preparation of N-[2-(Phenoxy)-propyl]-chloro-acetamidine hydrochloride.

40mg. of sodium were dissolved in 40ml. of dry methanol and the solution was stirred and treated, in one portion, with 3.8g. of chloro-acetonitrile; there was a slight exothermic reaction. Stirring was continued for 30 minutes and the resulting solution of methyl chloro-acetimidate was treated with 9.8g. of 2-(phenoxy)-propylamine hydrochloride, which dissolved immediately. After 5 hours at room temperature the solution was filtered to remove a small amount of insoluble material and then evaporated under reduced pressure. The residual brownish, amorphous N-[2-(phenoxy)-propyl]-chloro-acetamidine hydrochloride could not be crystallised but was shown to be homogeneous by thin layer chromatography.

Stage B: Preparation of N-[2-(Phenoxy)-propyl]-anilino-acetamidine hydriodide.

2.6g. of the amorphous N-[2-(phenoxy)-propyl]-chloro-acetamidine hydrochloride from Stage A was reacted with 1.86g. of aniline and the mixture was heated on the steam bath for 6 hours. The reaction mixture was then partitioned between 100ml. of water and 30ml. of ether; the aqueous layer was separated, washed with 30ml. of ether, and evaporated under reduced pressure to small volume (about 5ml.). This concentrated aqueous solution was treated with an excess of saturated aqueous potassium iodide and left at 0°C for 30 minutes. The resulting precipitate was filtered, washed with water and with ether, and dried in vacuo to give greyish crystals, m.p 167°–168°C with previous shrinking. Recrystallisation from a mixture of ethanol and ether and then from a mixture of *iso*propanol and ether gave N-[2-(phenoxy)-propyl]-anilino-acetamidine hydriodide, m.p. 168°–169°C.

Example 34: Preparation of N-[2-(Phenoxy)-propyl]-3-bromo-anilino-acetamidine hydriodide.

2.6g. of amorphous N-[2-(phenoxy-propyl]-chloro-acetamidine hydrochloride, prepared by the method of Stage A of Example 29, were reacted with 3.4g. of m-bromoaniline, and the mixture was heated on the steam bath for 4 hours. The warm reaction mixture was dissolved in a little ethanol and the solution was added to a mixture of 50ml. of water and 50ml. of ether containing 0.5ml. of 0.880 ammonia. The whole was shaken and the aqueous layer was separated, treated with an excess of aqueous potassium iodide and left at 4°C overnight. The resulting crystalline product was filtered, washed with water and with ether and dried in vacuo.

Recrystallisation from isopropanol containing a few drops of water gave N-[2-(phenoxy)-propyl]-3-bromo-anilino-acetamidine hydriodide, m.p. 175°–176.5°C.

Example 35: Preparation of N-[2-(Phenoxy)-propyl]-3-fluoro-anilino-acetamidine hydriodide.

N-[2-(phenoxy)-propyl]-3-fluoro-anilino-acetamidine hydriodide was prepared by the method of Example 34, using 2.2g. of m-fluoroaniline in place of m-bromoaniline. Two recrystallisations from isopropanol containing a little water gave the pure compound, m.p. 177.5°–178.5°C.

Example 36: Preparation of N-[2-(3-Chloro-phenoxy)-propyl]-anilino-acetamidine hydriodide.

A mixture of 1.86g. of 2-(3-chloro-phenoxy)-propylamine and 1.7g. of anilino-thioacetamide in 15ml. of ethanol was refluxed for 6 hours; during this time both hydrogen sulphide and ammonia were evolved. The solution was then evaporated to half volume under reduced pressure, treated with 5ml. of 2N hydrochloric acid and partitioned between water and ether. The aqueous layer was separated, washed once with ether, evaporated under reduced pressure to a volume of about 5ml., and treated with an excess of aqueous potassium iodide. The oil which precipitated crystallised on scratching and was filtered, washed with water and with ether, and dried to give a sticky greyish-green solid. Two recrystallisations from a mixture of ethanol and ether gave N-[2-(3-chloro-phenoxy)-propyl]-anilino-acetamidine hydriodide, m.p. 174°–176°C, identical with the product whose preparation was described in Example 13.

Example 37: Preparation of N-[2-(3-Chlorophenoxy)-propyl]-anilino-acetamidine hydrochloride.

Silver chloride was freshly prepared by adding 75ml. of 2N hydrochloric acid to a vigorously-stirred solution of 17.0g. of silver nitrate in water. The precipitate was repeatedly washed with water, by decantation, until the washings were neutral; and it was then further washed with methanol, three times by decantation.

Finally, the silver chloride was suspended in 50ml. of dry methanol, the mixture being stirred magnetically and warmed to 45°C, and then reacted with a warm solution of 22.5g. of N-[2-(3-chlorophenoxy)-propyl]-anilino-acetamidine hydriodide in 50ml. of methanol. This reaction mixture was stirred at 45°C for 15 minutes, and then filtered through a bed of "Hyflo Supercel". The clear, colourless filtrate was evaporated under reduced pressure, and the residue was recrystallised from a mixture of propan-2-ol and ether, to give the desired N-[2-(3-chlorophenoxy)-propyl]-anilino-acetamidine hydrochloride, m.p. 98.3°C.

Preparation of Intermediate Anilino-acetonitriles and Anilino-thioacetamides.

The intermediate anilino-acetonitriles and anilino-thioacetamides were prepared, portionwise as follows:

Method A: Preparation of Intermediate Anilino-acetonitriles.

15.7g. of paraformaldehyde were added portionwise to a stirred and cooled solution of 53.5g. of 3-methyl-aniline in 375ml. of acetic acid, the temperature being maintained at 15°–20°C. A solution of 41.2g. of potassium cyanide in 75ml. of water was added dropwise, while maintaining the temperature below 20°C, and the mixture was then stirred for 14 hours at 30°–40°C. Finally, most of the acetic acid was removed under reduced pressure at 50°C, and the residue was poured into 250ml. of water and extracted with ether. The ether extract was washed with water, then with saturated aqueous sodium bicarbonate solution, dried over sodium sulphate, evaporated and distilled under reduced pressure to give 3-methyl-anilino-acetonitrile, b.p. 117°–119°C/0.22 mm.

Details of other anilino-acetonitriles prepared by this method are given in Table 3 below.

Method B: Preparation of Intermediate Anilino-thioacetamides.

Gaseous hydrogen sulphide was passed through a solution of 8.1g. of anilino-acetonitrile in 19ml. of dry pyridine and 13ml. of dry triethylamine for a total of 3hours. The initial mildly exothermic reaction was moderated by water-cooling. The reaction solution was evaporated under reduced pressure; and the residue was recrystallised first from a mixture of ethanol and water and then from isopropanol, to give anilino-thioacetamide, m.p. 163°–164°C.

Details of other substituted anilino-thioacetamides prepared by this method are given in Table 3 below.

TABLE 3

Anilino-acetonitriles (R²·NH·CH₂·(CN), and Anilino-thioacetamides

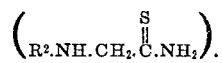

| R² | nitrile, b.p. (or m.p.), °C. | thioamide m.p. °C. | thioamide crystallisation solvent* |
|---|---|---|---|
| 3-Chloro-phenyl | 149°–151°/10.6mm. | — | — |
| 3-Methyl-phenyl | 117°–119°/0.22mm. | 148–150 | 1 |
| 3,4-Dimethyl-phenyl | m.p. 50–55 | 166–167 | 2 |
| 4-Chloro-phenyl | m.p. 58–62 | 117–119 | 2 |
| 3Trifluoromethyl-phenyl | 116°–120°/0.04mm. | 113–114 | 3,2 |
| 2,6-Dimethyl-phenyl | m.p. 84–85 | 125–126 | 1 |

(*) The crystallisation solvents employed in the preparations were as follows:
1. Ethanol.
2. A mixture of ethanol and water.
3. A mixture of benzene and light petroleum (b.p. 60°–80°C).

In order further to illustrate the invention examples will now be given of the preparation of certain pharmaceutical compositions incorporating preferred antiserotonin compounds:

Example 38:

Tablets were made by mixing 0.25g. of N-[2-(3-chloro-phenoxy)-propyl]-anilino-acetamidine hydrochloride in a fine powder with 0.25g. of lactose and 0.05g. of starch, then granulating the mixture with alcohol, or alcoholic polyvinyl pyrrolidone, or a mixture of equal parts of alcohol and water, drying the granules at 40°C, adding 0.005g. of magnesium stearate as a lubricant, and compressing the mixture directly into 0.555g. tablets.

Example 39:

Tablets were made by granulating 0.05g. of N-[2-(3-chloro-phenoxy)-propyl]-anilino-acetamidine hydrochloride in a fine powder with equal parts of alcohol and water, adding 0.0005g. of magnesium stearate as a lubricant and compressing the mixture directly into 0.0505g. tablets.

Example 40:

Tablets similar to those described in Examples 38 and 39 were made using N-[2-(phenoxy)-propyl]-anilino-acetamidine para-toluene-sulphonate instead of the 3-chloro-phenoxy compound.

Example 41:

Tablets were made similar to those described in Examples 38 and 39, using however instead of the N-[2-(3-chloro-phenoxy)-propyl]-anilino-acetamidine hydrochloride the same quantities of:

a. N-[2-(phenoxy)-propyl]-N¹-(methyl)-anilino-acetamidine para-toluene sulphonate, and
b. N-[2-(phenoxy)-propyl]-2,6-dimethyl-anilino-acetamidine naphthalene-2-sulphonate.

Example 42:

A topical formulation was made up from the following ingredients:

N-[2-(3-chloro-phenoxy)-propyl]-anilino-acetamidine hydrochloride — 0.5% w/w
Polyethylene glycol 1,000, monocetyl ether, emulsifying was (B.P.C.) — 30.0% w/w
Liquid paraffin (British Pharmacopeia, 1963) — 20.0% w/w
White soft paraffin (British Pharmaceoeia, 1963), to — 100.0% w/w The anilino-acetamidine hydrochloride and the liquid paraffin were mixed together into a paste, and added to a molten mixture of the emulsifying wax and the white soft paraffin. The whole was stirred until cool.

I claim:

1. An amidine of the formula

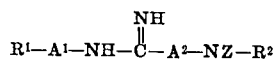

or an acid addition salt thereof with a pharmaceutically acceptable acid wherein: $R^1$ and $R^2$ are the same or different and each is phenyl optionally substituted in one or more positions by a substituent selected from the class consisting of halogen, lower alkyl, lower alkoxy, hydroxy, lower alkylthio, trifluoromethyl, phenyl, phenoxy, phenyl-(lower alkyl) and phenyl-(lower alkoxy), each of said phenyl, phenoxy, phenyl-(lower alkyl) and phenyl-(lower alkoxy) substituent groups being optionally substituted in one or more positions by a member selected from the class consisting of halogen, lower alkyl, lower alkoxy, hydroxy and lower alkylthio; $A^1$ is a divalent straight or branched alkylene group containing from two to six carbon atoms and one or two divalent atoms which are each an oxygen or sulphur atom, provided that there are at least two carbon atoms between the divalent atom and the —NH— group and between the two divalent atoms; $A^2$ is a straight or branched alkylene chain containing from one to four carbon atoms; and Z is a member selected from the class consisting of hydrogen and lower alkyl.

2. An anilino-acetamidine of the formula

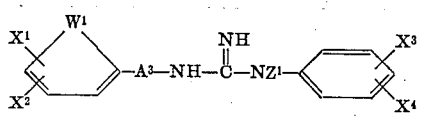

or an acid addition salt thereof with a pharmaceutically acceptable acid: wherein $W^1$ represents —CH=CH—; $A_3$ is an alkylene group containing from two to four carbon atoms and a single oxygen or sulphur atom separated by at least two carbon atoms from the —NH— group, $X^1$, $X^2$, $X^3$ and $X^4$ are each individually a member selected from the class consisting of hydrogen, halogen, lower alkyl, lower alkoxy and trifluoromethyl; and $Z^1$ is a member selected from the class consisting of hydrogen and methyl.

3. An anilino-acetamidine selected from the class consisting of N-[2-(3-methoxy-phenoxy)-propyl]-3-methyl-anilino-acetamidine, N-[2-(3-methyl-phenoxy)-propyl]-3-methyl-anilino-acetamidine, N-[2-(3-chloro-phenoxy)-propyl]-anilino-acetamidine, N-[2-3-(3-ethyl-phenoxy)-propyl]-anilino-acetamidine, and N-[2-(phenoxy)-propyl]-anilino-acetamidine, and acid addition salts thereof with pharmaceutically acceptable acids.

4. A compound according to claim 1 which is N-[2-(3-methoxy-phenoxy)-propyl]-3-methyl-anilino-acetamidine or an acid addition salt thereof with a pharmaceutically acceptable acid.

5. A compound according to claim 1 which is N-[2-benzyloxy)-propyl]-anilino-acetamidine or an acid addition salt thereof with a pharmaceutically acceptable acid.

6. A compound according to claim 1 which is N-[2-(3-methoxy-phenoxy)-propyl]-3, 4-dimethyl-anilino-acetamidine or an acid addition salt thereof with a pharmaceutically acceptable acid.

7. A compound according to claim 1 which is N-[2-(3-methyl-phenoxy)-propyl]-4-chloro-anilino-acetamidine or an acid addition salt thereof with a pharmaceutically acceptable acid.

8. A compound according to claim 1 which is N-[2-(3-methyl-phenoxy)]propyl]-3-methyl-anilino-acetamidine or an acid addition salt thereof with a pharmaceutically acceptable acid.

9. A compound according to claim 1 which is N-[2-(3-methoxy-phenoxy)-propyl]-3-trifluoromethyl-anilino-acetamidine or an acid addition salt thereof with a pharmaceutically acceptable acid.

10. A compound according to claim 1 which is N-[2-(3-ethyl-phenoxy)-propyl]-anilino-acetamidine or an acid addition salt thereof with a pharmaceutically acceptable acid.

11. A compound according to claim 1 which is N-[2-(phenoxy)-propyl]-$N^1$-(methyl)-anilino-acetamidine or an acid addition salt thereof with a pharmaceutically acceptable acid.

12. A compound according to claim 1 which is N-[2-(phenoxy)-ethyl]-anilino-acetamidine or an acid addition salt thereof with a pharmaceutically acceptable acid.

13. A compound according to claim 1 which is N-[2-(phenoxy)-propyl]-anilino-acetamidine or an acid addition salt thereof with a pharmaceutically acceptable acid.

14. A compound according to claim 1 which is N-[2-(3-methoxy-phenoxy)-propyl]-3-chloro-anilino-acetamidine or an acid addition salt thereof with a pharmaceutically acceptable acid.

15. A compound according to claim 1 which is N-[2-(3-benzyl-phenoxy)-propyl]-anilino-acetamidine or an acid addition salt thereof with a pharmaceutically acceptable acid.

16. The compound N-[2-(3-chloro-phenoxy)-propyl]-anilino-acetamidine.

17. An acid addition salt of the compound of claim 16 with a pharmaceutically acceptable acid.

18. The hydriodide salt of the compound of claim 16.

19. The hydrochloride salt of the compound of claim 16.

* * * * *